(12) United States Patent
Birkner et al.

(10) Patent No.: US 6,732,523 B2
(45) Date of Patent: May 11, 2004

(54) METHOD FOR CONTROLLING A CHARGE PRESSURE IN AN INTERNAL COMBUSTION ENGINE WITH AN EXHAUST GAS TURBOCHARGER

(75) Inventors: Christian Birkner, Irlbach (DE); Michael Nienhoff, Regensburg (DE); Wolfgang Oestreicher, Regensburg (DE); Wolfgang Stadler, Ergoldsbach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/334,332

(22) Filed: Dec. 31, 2002

(65) Prior Publication Data

US 2003/0101723 A1 Jun. 5, 2003

Related U.S. Application Data

(63) Continuation of application No. PCT/DE01/02328, filed on Jun. 25, 2001.

(30) Foreign Application Priority Data

Jul. 7, 2000 (DE) .......................................... 100 33 114

(51) Int. Cl.⁷ ............................................... F02B 33/44
(52) U.S. Cl. ........................................ 60/605.1; 60/611

(58) Field of Search ................................. 60/602, 605.1, 60/611

(56) References Cited

U.S. PATENT DOCUMENTS

| 4,426,982 A | * | 1/1984 | Lehner et al. ............... 123/501 |
| 5,186,081 A | * | 2/1993 | Richardson et al. .......... 477/33 |
| 6,065,496 A | * | 5/2000 | Sanzenbacher et al. 137/625.65 |

FOREIGN PATENT DOCUMENTS

| DE | 42 14 648 A1 | 11/1993 |
| DE | 197 09 955 A1 | 9/1998 |
| EP | 0 683 308 A2 | 4/1995 |
| EP | 1 026 378 A2 | 8/2000 |

OTHER PUBLICATIONS

Hack, Langkabel "Turbo Und Kompressormotoren: Entwicklung, Technik, Typen", no date.

* cited by examiner

Primary Examiner—Hoang Nguyen
(74) Attorney, Agent, or Firm—Baker Botts L.L.P.

(57) ABSTRACT

A method for precisely controlling the charge pressure in an internal combustion engine with an exhaust-gas turbocharger is disclosed. According to said method, the output or torque of the turbine is determined based on the outputs or torques of the compressor and the loss on the shaft and the selected set point for the correcting variable for adjusting the charge pressure is determined according to said output or said torque of the turbine.

24 Claims, 5 Drawing Sheets

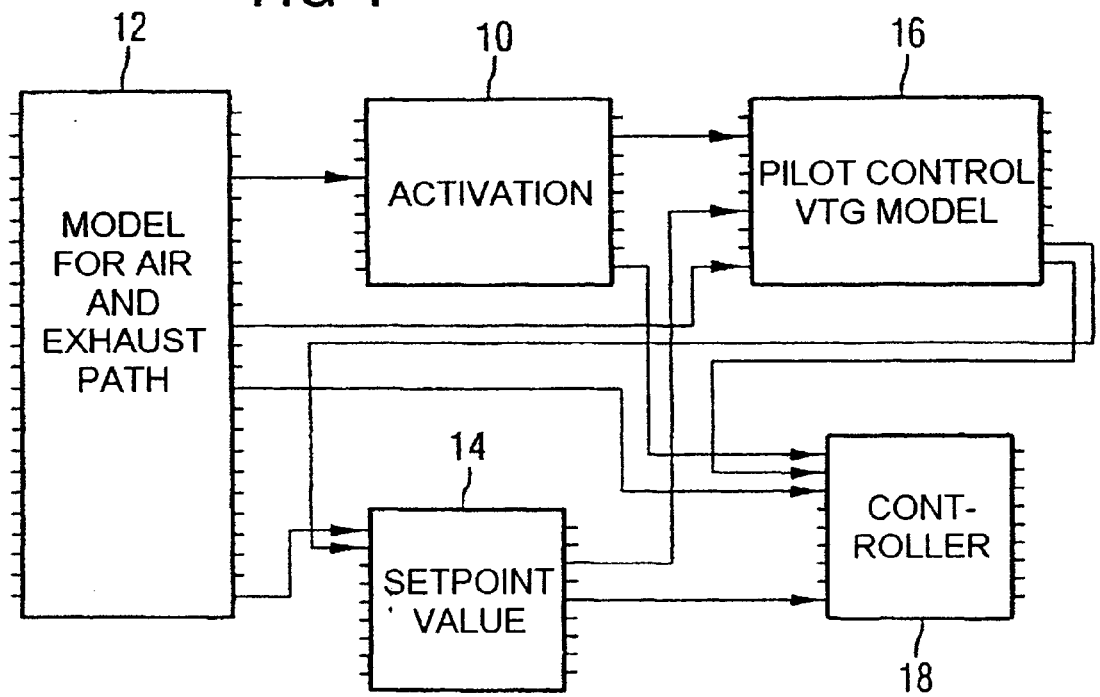
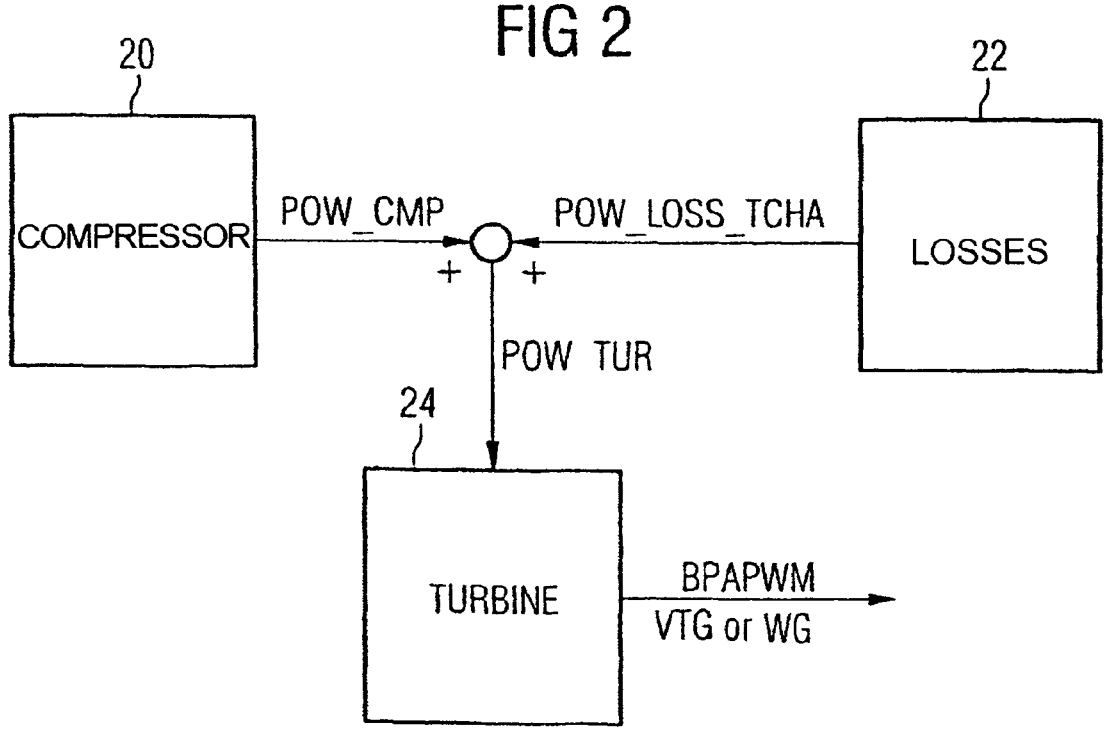

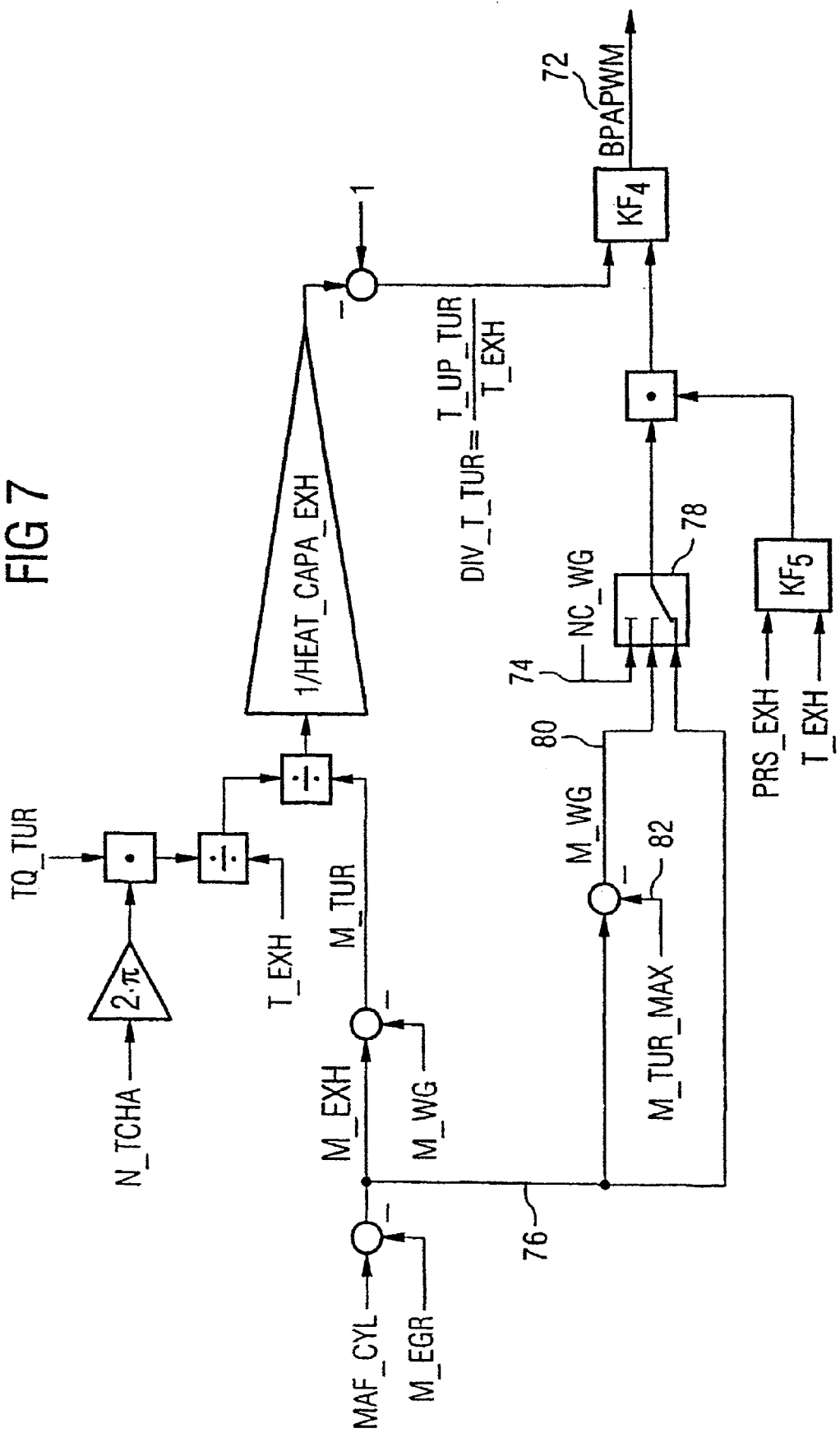

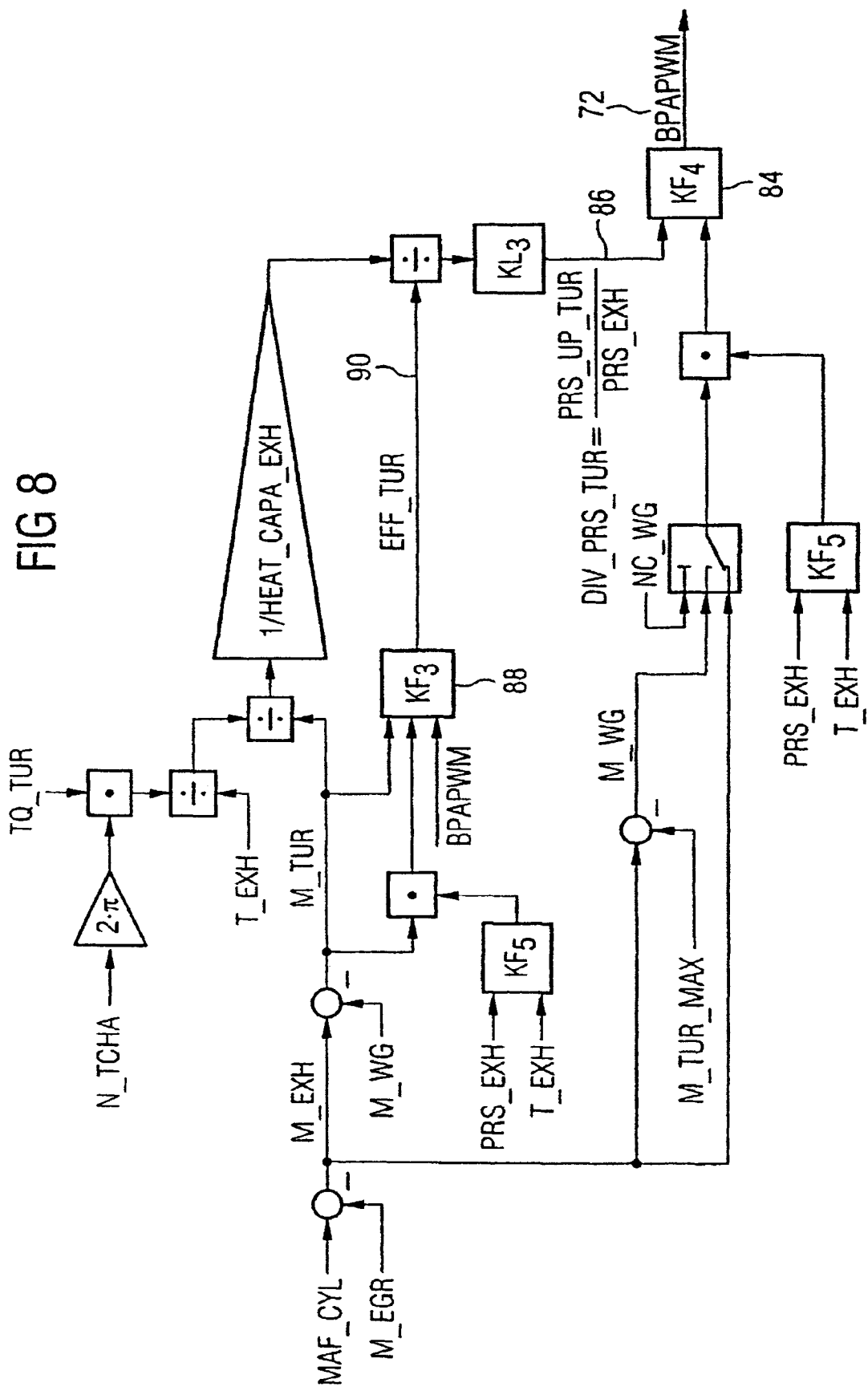

METHOD FOR CONTROLLING A CHARGE PRESSURE IN AN INTERNAL COMBUSTION ENGINE WITH AN EXHAUST GAS TURBOCHARGER

CROSS REFERENCE TO RELATED APPLICATION

This application is a continuation of copending International Application No. PCT/DE01/02328 filed Jun. 25, 2001, which designates the United States.

BACKGROUND OF THE INVENTION

The invention relates to a method for controlling a charge pressure in an internal combustion engine with an exhaust gas turbocharger.

An exhaust gas turbocharger (ATL) is composed of two turbo machines: a turbine and a compressor which are mounted on a common shaft. The turbine uses the energy contained in the exhaust gas to drive the compressor which sucks in fresh air and forces precompressed air into the cylinders of an internal combustion engine. The exhaust gas turbocharger is connected in terms of fluid flow to the internal combustion engine by means of the stream of air and exhaust gas. Exhaust gas turbochargers are used in internal combustion engines in passenger cars and lorries and in large-scale internal combustion engines. In particular in the case of passenger car exhaust gas turbochargers, owing to the large rotational speed range it is necessary to control the exhaust gas turbocharger in order to obtain a virtually constant and precise charge pressure in a relatively wide rotational speed range.

Control devices are known for making available a specific setpoint charge pressure. It is necessary to take into account the fact that the charge pressure which is generated at the exhaust gas turbocharger generally depends on the operating point of the internal combustion engine. One possible way of influencing the charge pressure of an exhaust gas turbocharger is provided by exhaust gas turbochargers with variable turbine geometry (VTG). The process of controlling the charge pressure using the variable turbine geometry is carried out by means of a VTG actuator whose actuation is accompanied by the definition of a manipulated variable. In order to control the charge pressure it is also possible to use a charge pressure control valve (WASTEGATE) which is arranged at the exhaust gas end. During this exhaust gas-end control, a portion of the exhaust gases is conducted around the turbine so that a smaller stream of exhaust gas flows through the turbine, depending on the stream of exhaust gas conducted around.

DE 197 09 955 A1 discloses a method for controlling an internal combustion engine which is provided with a control device which has physical models of a supercharger device and of an intake tract. These models are used to determine estimated values for the charge pressure and for the air mass flow rate into the cylinders which are used to control the internal combustion engine.

DE 42 14 648 A1 discloses a method for controlling an internal combustion engine having a turbocharger and an exhaust gas feedback, in which method the rotational speed of the supercharger shaft is determined by integrating the difference between the power levels of the compressor and of the turbine of the turbocharger. A charge pressure signal is then calculated on the basis of the rotational speed of the supercharger shaft. The charge pressure signal is then used, together with further signals, to control the internal combustion engine.

SUMMARY OF THE INVENTION

The invention is based on the object of making available a method for controlling the charge pressure, which uses simple means to permit the charge pressure to be set precisely and reliably.

The object can be achieved by a method for controlling a charge pressure in an internal combustion engine with an exhaust gas turbocharger consisting of a turbine and a charge air compressor in which a manipulated variable is determined for setting the charge pressure which is emitted by the charge air compressor and has the following method steps:

determining the power or the torque of the compressor, determining the power or torque loss which occurs during the transmission from the turbine to the compressor, and determining the power or the torque of the turbine from the power or the torque of the compressor and the power or torque loss, and determining a predefined setpoint value for the manipulated variable as a function of the power or the torque of the turbine.

An embodiment according to the present invention can be an apparatus for controlling a charge pressure in an internal combustion engine with an exhaust gas turbocharger consisting of a turbine and a charge air compressor in which a manipulated variable is determined for setting the charge pressure which is emitted by the charge air compressor comprising:

means for determining the power or the torque of the compressor, means for determining the power or torque loss which occurs during the transmission from the turbine to the compressor, and means for determining the power or the torque of the turbine from the power or the torque of the compressor and the power or torque loss, and means for determining a predefined setpoint value for the manipulated variable as a function of the power or the torque of the turbine.

The power or the torque of the compressor can be determined using an isentropic compressor efficiency level, the isentropic compressor efficiency level being determined by means of a first characteristic diagram as a function of the following variables:

pressure downstream of the compressor, fresh air mass flow rate fed to the internal combustion engine, ambient pressure and ambient temperature.

The rotational speed of the turbine can be calculated by means of a second characteristic diagram as a function of the following variables:

mass flow rate across the compressor, exhaust gas pressure downstream of the compressor, ambient pressure, and ambient temperature.

The second characteristic diagram may additionally depend on the value of the manipulated variable for the charge pressure. The rotational speed of the turbine can be measured. The power or torque loss can be determined as a function of the rotational speed of the turbine by means of a predetermined characteristic curve. The manipulated variable for the charge pressure may be determined as a function of the isentropic efficiency level of the turbine, and the isentropic efficiency level of the turbine is determined using a third characteristic diagram as a function of the following variables:

mass flow rate across the turbine, exhaust gas temperature and exhaust gas pressure upstream of the turbine, the third characteristic diagram depending additionally on the value of the manipulated variable for the charge pressure.

The manipulated variable for the charge pressure can be calculated by a fourth characteristic diagram as a function of the following variables:

exhaust gas mass flow rate, exhaust gas pressure upstream of the turbine and exhaust gas temperature, and a turbine pressure ratio which depends on the isentropic efficiency level of the turbine which is determined. The manipulated variable for the charge pressure can be determined by means of a characteristic diagram as a function of the temperature ratio at the turbine and the following variables:

exhaust gas mass flow, exhaust gas pressure upstream of the turbine and exhaust gas temperature.

The manipulated variable for the charge pressure can act on a variable turbine geometry. The manipulated variable for the charge pressure can further act on a charge pressure valve which is arranged at the exhaust gas end. The mass flow rate across the charge pressure valve can be obtained as the difference between the exhaust gas mass flow rate and a maximum turbine mass flow rate.

As mentioned above, according to one embodiment of the invention, in a first step in the method the power or the torque of the compressor is determined. The power and torque of the compressor are linked to one another by means of the rotational speed of the turbocharger, the torque being inversely proportional to the rotational speed of the turbocharger, and proportional to the power of the compressor. According to the invention, in a second step the power or torque losses which occur during the transmission from the turbine to the compressor are determined. In particular gap losses, frictional losses of the shaft etc. are taken into account here. In order to determine the power loss or the torque loss, it is assumed that the losses are dependent on the power or the torque of the compressor. The proportionality factor is dependent on the operating state and is determined using a characteristic curve. In a third step, the power and/or the torque of the turbine are determined from the previously determined power levels and torques. Said power or torque is a direct result of the two previously determined physical variables. As a function of the power or the torque of the turbine, a predefined setpoint value is subsequently determined for the manipulated variable for setting the charge pressure. It is advantageous here that not only the parameters which characterize the operating states of the engine but also the states of the turbine are taken into account. In the method according to the invention, the unambiguously defined, thermodynamic state of the turbine is described. This makes it possible to set or control the charge pressure quickly and very precisely in an internal combustion engine with ATL.

In a preferred refinement of the method, the power or the torque of the compressor is determined using the isentropic compressor efficiency level, the isentropic compressor efficiency level being determined by a first characteristic diagram as a function of the pressure downstream of the compressor, and the fresh air mass flow rate as well as the ambient pressure and the ambient temperature. The isentropic compressor efficiency level is stored, as a first characteristic diagram, as a function of the pressure ratio between the pressure downstream of the compressor and the ambient pressure and the quotient of the fresh air mass flow rate and ambient pressure multiplied by the root of the ambient temperature.

If a measuring device for measuring the rotational speed of the turbine is not provided on the exhaust gas turbocharger, the value of the rotational speed of the turbine is calculated by means of a second characteristic diagram as a function of the mass flow rate via the compressor, the exhaust gas pressure downstream of the compressor, ambient pressure and the exhaust gas temperature.

In order to calculate the rotational speed of the turbine more precisely, in particular when there is a variable turbine geometry, the second characteristic diagram can additionally depend on the value of the manipulated variable for the charge pressure. It is also possible for the rotational speed of the turbine to be measured directly on the turbine. A contactless measurement of the rotational speed of the turbine, for example an inductive or optical measurement, is preferably carried out here.

The power loss or torque loss is determined as a function of the rotational speed of the turbine by means of a predetermined characteristic curve. In order to determine the loss, the losses which are not covered by the isentropic efficiency level of the compressor are taken into account in the characteristic curve. To do this, the losses are represented as a function of the rotational speed of the turbine. The characteristic curve is preferably not represented directly as a function of the rotational speed of the turbine but rather as a function of the rotational speed of the turbine standardized to the maximum rotational speed of the turbine.

In one development of the method, the manipulated variable is determined as a function of the pressure ratio of the turbine, which is calculated by means of a polytropic relationship as a function of the isentropic efficiency level of the turbine, the isentropic efficiency level of the turbine being determined using a third characteristic diagram as a function of the mass flow rate across the turbine, the exhaust gas temperature and the exhaust gas pressure upstream of the turbine. In addition, in the third characteristic diagram the value of the manipulated variable for the charge pressure is taken into account. The manipulated variable itself is determined by means of a fourth characteristic diagram as a function of the exhaust gas mass flow rate, the exhaust gas pressure upstream of the turbine and the exhaust gas temperature, as well as the turbine pressure ratio, the turbine pressure ratio depending in turn on the calculated isentropic efficiency level of the turbine. It is decisive here that the fourth characteristic diagram depends on the turbine pressure ratio, which simplifies the use of turbine characteristic diagrams which are already known and compiled.

Alternatively to this, it is also possible for the manipulated variable to be determined by means of a characteristic diagram as a function of the temperature ratio at the turbine, the variables of the exhaust gas flow rate, of the exhaust gas pressure upstream of the turbine and of the exhaust gas temperature being then taken into account. While the manipulated variable is determined, the characteristic diagram is dependent on the temperature ratio at the turbine, as a result of which, on the one hand, calculation of the isentropic efficiency level of the turbine can be omitted, but on the other hand, the fourth characteristic diagram must be set up as a function of the temperature.

With the method according to the invention, the charge pressure is set by means of a turbine with a variable turbine geometry or by means of a WASTEGATE with a valve.

When a WASTEGATE is used, the mass flow rate which flows across the WASTEGATE is formed as the difference between the exhaust gas mass flow rate and a maximum turbine mass flow rate, in order to protect the turbine.

BRIEF DESCRIPTION OF THE DRAWINGS

Exemplary embodiments of the invention are explained in more detail below with reference to the drawings, in which:

FIG. 1 shows a schematic design of the controller structure,

FIG. 2 shows three functional blocks for the model of the turbocharger,

FIG. 7 shows the calculation of the pulse duty factor for the actuator element when the temperature ratio is used, and FIG. 8 shows the calculation of the pulse duty factor when the pressure ratio at the turbine is used as the basis for the calculation of the pulse duty factor.

DETAILED DESCRIPTION OF THE PREFERRED EMBODIMENTS

Figure 3:
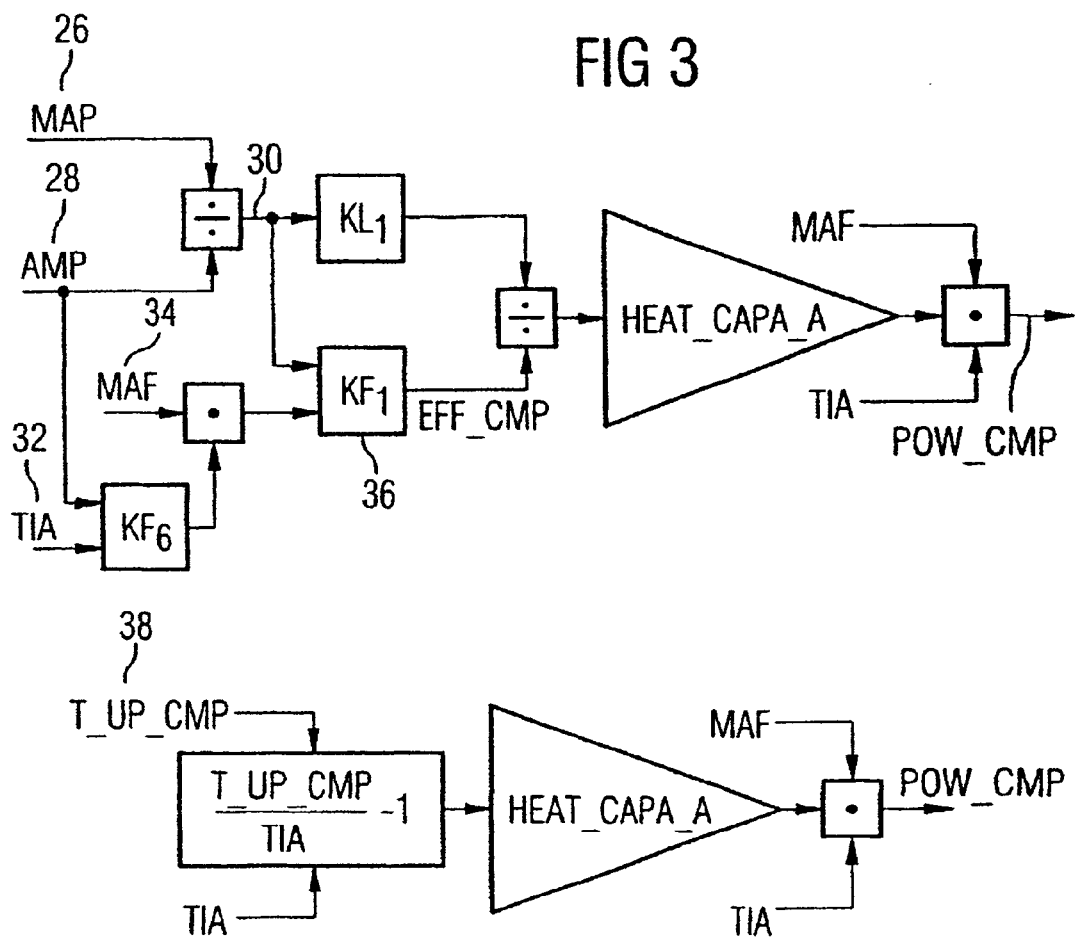
FIG. 3 shows the determination of the power of the compressor, once as a function of the pressures and once as a function of the temperature.

The schematic design of the control system which is illustrated in FIG. 1 has an activation unit 10 which is connected either into a closed-loop or open-loop controlled operation as a function of the operating points of the internal combustion engine. The activation conditions are dependent on the operating points of the internal combustion engine which are determined either by means of measuring or in the model of the air/exhaust gas path 12.

The setpoint value unit 14 determines setpoint values which are dependent on the operating parameters of the internal combustion engine, of the turbocharger, the ambient conditions and the calculated variables from the model 12. These setpoint values are additionally also dynamically corrected in order to obtain optimum adaptation of the setpoint value in the nonsteady operating states. The setpoint values are passed onto to a pilot control unit 16 and to a controller 18. The pilot control unit 16 may, for example, contain a VTG model in order to actuate the variable turbine geometry in accordance with the predefined setpoint values.

In the model unit 12 for the air and exhaust gas path, the nonmeasured states in the air/exhaust gas pathway are determined and made available to the other units 10, 14, 16 and 18. The controller may be embodied as a conventional PI controller which preferably has a parallel correction branch with DT1 behavior. Inaccuracies in the pilot control and of the model unit 12 for the air and exhaust gas pathway are compensated using the controller. The model structure is described in more detail with reference to FIG. 2 using the example of the power balance. In a compressor model element 20, the power of the compressor is calculated by means of the thermodynamic states at the compressor. In order to be able to convert this power of the compressor (POW_CMP) into the power of the turbine (POW_TUR), the losses occurring at the shaft between the compressor and turbine is calculated in a loss model element 22. The sum of the compressor power and loss power yields the turbine power (POW_TUR) which is applied as an input variable to the turbine model element 24. The turbine model element determines the pulse duty factor (BPAPWM) for the variable turbine geometry (VTG) or the WASTEGATE (WG). From the above it becomes clear that the same approach applies to the torques which act on the shaft.

The individual model elements are explained in detail below. FIG. 3 shows the calculation of the compressor power (POW_CMP). The compressor power includes the quotient formed from the ambient pressure (AMP) 28 and pressure at the compressor (MAP) 26, the quotient 30 of which lies on a characteristic curve KL1. The characteristic curve KL1 calculates the following variable:

$$KL_1 = f(MAP, AMP) = \left(\frac{AMP}{MAP}\right)^{\frac{CAPA\_MAF-1}{CAPA\_MAF}} - 1$$

CAPA_MAF designating the isentropic exponent of air.

In addition to the ambient pressure (AMP) 28, the fresh air mass flow rate (MAF) 34 and the ambient temperature (TIA) 32 are also taken into account in the characteristic diagram KF1. The isentropic compressor efficiency level (EFF_CMP) is determined in the characteristic diagram KF1 36. The power of the compressor can thus be calculated by taking into account the fresh air mass flow rate and the ambient temperature as well as the specific thermal capacity of air. If the torque balance is to be considered instead of the power balance in FIG. 2, the power of the compressor which is calculated in FIG. 3 is to be divided by the rotational speed (N_TCHA) of the turbine and the factor $2\pi$. When a separate value of the temperature downstream of the compressor (T_UP_CMP) 38 is present, a predefined setpoint value is also possible by means of the temperature ratio at the compressor.

Figure 4:
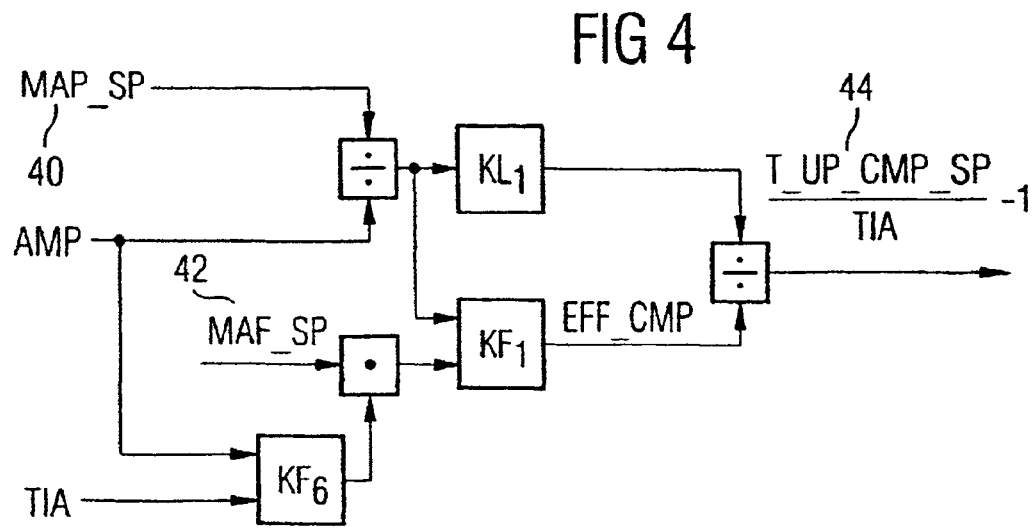
FIG. 4 shows the determination of setpoint values for the temperature ratio.

FIG. 4 illustrates that the compressor model which is explained with reference FIG. 3 can also be used in order to calculate the setpoint value for the temperature downstream of the compressor (T_UP_CMP_SP) 44 from a setpoint value for the pressure at the compressor (MAP_SP) 40 and from a setpoint value for the fresh air mass flow rate (MAF_SP) 42.

Figure 5:
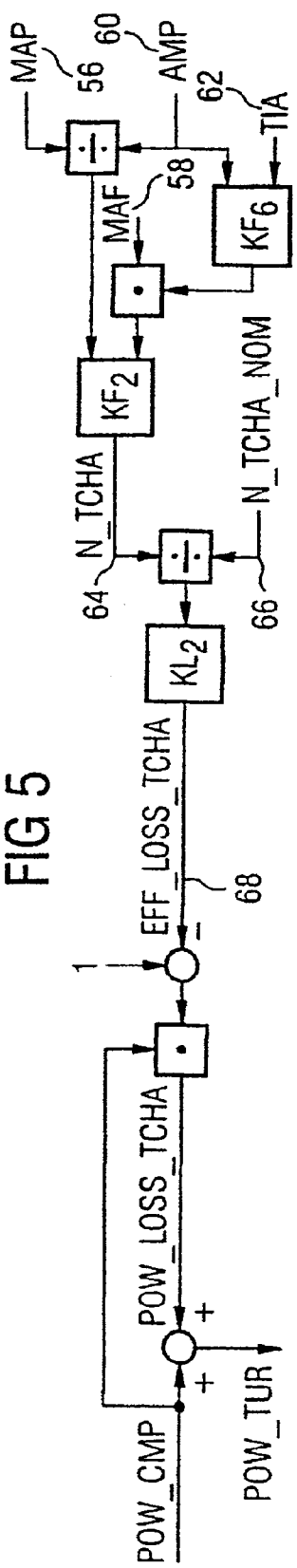
FIG. 5 shows the calculation of the turbine power.

The two possible ways of calculating the losses are described with reference to FIGS. 5 and 6. FIG. 5 shows, using the example of the power balance, the calculation of the power loss if there is no measurement of the rotational speed of the turbine. In this case, the rotational speed (N_TCHA) 64 of the turbine is determined using the characteristic diagram KF2 as a function of the pressure at the compressor (MAP) 56, the fresh air mass flow rate (MAF) 58, the ambient pressure (AMP) 60 and the ambient temperature (TIA) 62. With reference to a standardized rotational speed (N_TCHA_NOM) 66 of the turbine it is possible to calculate the nonisentropic loss of the turbocharger (EFF_LOSS_TCHA) 68 by means of the characteristic curve KL2. The power loss of the exhaust gas turbocharger is thus obtained as:

POW_LOSS_TCHA=(1−EFF_LOSS_TCHA)POW_CMP

Figure 6:
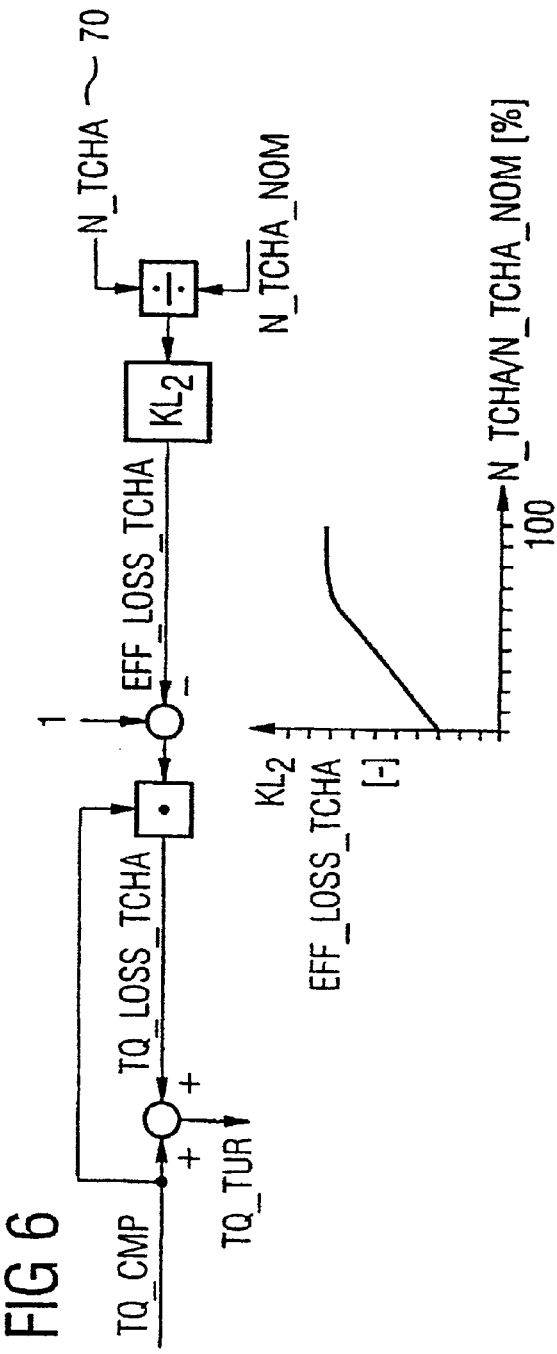
FIG. 6 shows the calculation of the turbine torque for the case in which the rotational speed of the turbine is measured.

FIG. 6 explains the calculation of the turbine torque for the case in which the measured rotational speed (N_TCHA) 70 of the turbine is known. In comparison to the calculation described with reference to FIG. 5, in this way the suitably standardized rotational speed of the turbine can be used directly with the characteristic diagram KL2. An exemplary profile for such a characteristic diagram is represented in the lower part of FIG. 6. It is shown that the nonisentropic losses of the turbocharger rise with the standardized rotational speed (N_TCHA/N_TCHA_NOM) of the turbine.

FIGS. 7 and 8 explain the calculation of the pulse duty factor (BPAPWM) 72 for the actuator. Both figures explain the calculation of the manipulated variable by reference to the turbine torque (TQ_TUR) 74. However, the same calculation can also be carried out on the basis of the turbine power (POW_TUR) 74. In the calculation illustrated in FIG. 7, the manipulated variable 72 (BPAPWM) is calculated as a function of the temperature ratio (DIV_T_TUR= T_UP_TUR/T_EXH). The fourth characteristic diagram KF4 has the following dependencies:

$$KF_4 = BPAPWM = f\left(\frac{T\_UP\_TUR}{T\_EXH}; M\_EXH \cdot \frac{\sqrt{T\_EXH}}{PRS\_EXH}\right)$$

where T_UP_TUR designates the temperature downstream of the turbine, T_EXH the exhaust gas temperature, M_EXH the exhaust gas mass flow rate across the turbine and PRS_EXH the exhaust pressure upstream of the turbine.

As a function of the pressure ratio (DIV_PRS_TUR= PRS_UP_TUR/PRS_EXH), the fourth characteristic diagram has the following form:

$$KF_4 = BPAPWM = f\left(\frac{PRS\_UP\_TUR}{PRS\_EXH}, M\_EXH \cdot \frac{\sqrt{T\_EXH}}{PRS\_EXH}\right)$$

The model illustrated in FIG. 7 permits a particularly simple way of switching over a WASTEGATE control system. In response to a control signal (NC_WG), the system switches backward and forward between two states. In the connection illustrated in FIG. 7, a VTG control process is carried out in which the exhaust gas mass flow rate across the turbine (M_EXH) 76 is used. With a WASTEGATE control system, contact with the port 78 is established in response to the control signal 74 so that the mass flow rate across the WASTEGATE 80 (M_WG) takes the place of the exhaust gas flow rate across the turbine. The mass flow rate across the WASTEGATE is obtained as the mass flow rate across the turbine minus a maximum flow rate across the turbine (M_TUR_MAX) 82. The use of the maximum flow rate across the turbine 82 makes it possible to protect the turbine against destruction by an excessively large mass flow rate.

FIG. 8 shows the calculation of the manipulated variable 72 as a function of the characteristic diagram KF4 84 which depends on the pressure ratio (DIV_PRS_TUR) 86 at the turbine. The isentropic turbine efficiency level 90 is calculated using the third characteristic diagram (KF3) 88 in order to determine the pressure ratio 86. Said turbine efficiency level 90 can be converted into the pressure ratio by means of the characteristic diagram KL3 (polytropic relationship between the temperature ratio and the pressure ratio) as follows:

$$KL_3 = f(EFF\_TUR; T\_TUR; T\_EXH) = \left(1 - \underbrace{\left[\frac{1}{EFF\_TUR} \cdot \left(1 - \frac{T\_UP\_TUR}{T\_EXH}\right)\right]}_{INPUT}\right)^{\frac{CAPA\_EXH}{CAPA\_EXH-1}}$$

The values for the exhaust gas pressure upstream of the turbine (PRS_EXH) and the exhaust gas temperature (T_EXH) as well as the mass flow rate across the EGR are estimated in the model in FIG. 8. It has become apparent that the sensitivity of the model to the manipulated variable 72 (BPAPWM), which is on the one hand the result of the model and on the other hand is included in the third characteristic diagram (KF3) 88, is small so that stable and precise results are obtained. As an alternative to the manipulated variable 72 (pulse duty factor) in the third characteristic diagram, it is also possible to use a position feedback of the Wastegate or the VTG position in the characteristic diagram.

What is claimed is:

1. A Method for controlling a charge pressure in an internal combustion engine with an exhaust gas turbocharger consisting of a turbine and a charge air compressor in which a manipulated variable is determined for setting the charge pressure which is emitted by the charge air compressor and has the following method steps:
   determining the power or the torque of the compressor,
   determining the power or torque loss which occurs during the transmission from the turbine to the compressor, and
   determining the power or the torque of the turbine from the power or the torque of the compressor and the power or torque loss, and determining a predefined setpoint value for the manipulated variable as a function of the power or the torque of the turbine.

2. The method as claimed in claim 1, wherein the power or the torque of the compressor is determined using an isentropic compressor efficiency level, the isentropic compressor efficiency level being determined by means of a first characteristic diagram as a function of the following variables:
   pressure downstream of the compressor,
   fresh air mass flow rate fed to the internal combustion engine,
   ambient pressure and
   ambient temperature.

3. The method as claimed in claim 1, wherein the rotational speed of the turbine is calculated, the value of the rotational speed of the turbine being calculated by means of a second characteristic diagram as a function of the following variables:
   mass flow rate across the compressor,
   exhaust gas pressure downstream of the compressor, ambient pressure, and
   ambient temperature.

4. The method as claimed in claim 3, wherein the second characteristic diagram additionally depends on the value of the manipulated variable for the charge pressure.

5. The method as claimed in claim 1, wherein the rotational speed of the turbine is measured.

6. The method as claimed in claim 3, wherein the power or torque loss is determined as a function of the rotational speed of the turbine by means of a predetermined characteristic curve.

7. The method as claimed in claim 1, wherein the manipulated variable for the charge pressure is determined as a function of the isentropic efficiency level of the turbine, and the isentropic efficiency level of the turbine is determined using a third characteristic diagram as a function of the following variables:
   mass flow rate across the turbine,
   exhaust gas temperature and
   exhaust gas pressure upstream of the turbine,
   the third characteristic diagram depending additionally on the value of the manipulated variable for the charge pressure.

8. The method as claimed in claim 7, wherein the manipulated variable for the charge pressure is calculated by a fourth characteristic diagram as a function of the following variables:

exhaust gas mass flow rate, exhaust gas pressure upstream of the turbine and exhaust gas temperature, and a turbine pressure ratio which depends on the isentropic efficiency level of the turbine which is determined.

9. The method as claimed in claim 1, wherein the manipulated variable for the charge pressure is determined by means of a characteristic diagram as a function of the temperature ratio at the turbine and the following variables:

exhaust gas mass flow, exhaust gas pressure upstream of the turbine and exhaust gas temperature.

10. The method as claimed in claim 1, wherein the manipulated variable for the charge pressure acts on a variable turbine geometry.

11. The method as claimed in claim 1, wherein the manipulated variable for the charge pressure acts on a charge pressure valve which is arranged at the exhaust gas end.

12. The method as claimed in claim 11, wherein the mass flow rate across the charge pressure valve is obtained as the difference between the exhaust gas mass flow rate and a maximum turbine mass flow rate.

13. Apparatus for controlling a charge pressure in an internal combustion engine with an exhaust gas turbocharger consisting of a turbine and a charge air compressor in which a manipulated variable is determined for setting the charge pressure which is emitted by the charge air compressor comprising:

means for determining the power or the torque of the compressor, means for determining the power or torque loss which occurs during the transmission from the turbine to the compressor, and means for determining the power or the torque of the turbine from the power or the torque of the compressor and the power or torque loss, and means for determining a predefined setpoint value for the manipulated variable as a function of the power or the torque of the turbine.

14. The apparatus as claimed in claim 13, wherein the power or the torque of the compressor is determined using an isentropic compressor efficiency level, the isentropic compressor efficiency level being determined by means of a first characteristic diagram as a function of the following variables:

pressure downstream of the compressor, fresh air mass flow rate fed to the internal combustion engine, ambient pressure and ambient temperature.

15. The apparatus as claimed in claim 13, wherein the rotational speed of the turbine is calculated, the value of the rotational speed of the turbine being calculated by means of a second characteristic diagram as a function of the following variables:

mass flow rate across the compressor, exhaust gas pressure downstream of the compressor, ambient pressure, and ambient temperature.

16. The apparatus as claimed in claim 15, wherein the second characteristic diagram additionally depends on the value of the manipulated variable for the charge pressure.

17. The apparatus as claimed in claim 13, wherein the rotational speed of the turbine is measured.

18. The apparatus as claimed in claim 15, wherein the power or torque loss is determined as a function of the rotational speed of the turbine by means of a predetermined characteristic curve.

19. The apparatus as claimed in claim 13, further comprising means for determining the manipulated variable for the charge pressure as a function of the isentropic efficiency level of the turbine, and means for determining the isentropic efficiency level of the turbine using a third characteristic diagram as a function of the following variables:

mass flow rate across the turbine, exhaust gas temperature and exhaust gas pressure upstream of the turbine, the third characteristic diagram depending additionally on the value of the manipulated variable for the charge pressure.

20. The apparatus as claimed in claim 19, further comprising means for calculating the manipulated variable for the charge pressure by a fourth characteristic diagram as a function of the following variables:

exhaust gas mass flow rate, exhaust gas pressure upstream of the turbine and exhaust gas temperature, and a turbine pressure ratio which depends on the isentropic efficiency level of the turbine which is determined.

21. The apparatus as claimed in claim 13, further comprising means for determining the manipulated variable for the charge pressure by means of a characteristic diagram as a function of the temperature ratio at the turbine and the following variables:

exhaust gas mass flow, exhaust gas pressure upstream of the turbine and exhaust gas temperature.

22. The apparatus as claimed in claim 13, wherein the manipulated variable for the charge pressure acts on a variable turbine geometry.

23. The apparatus as claimed in claim 13, wherein the manipulated variable for the charge pressure acts on a charge pressure valve which is arranged at the exhaust gas end.

24. The apparatus as claimed in claim 23, wherein the mass flow rate across the charge pressure valve is obtained as the difference between the exhaust gas mass flow rate and a maximum turbine mass flow rate.

* * * * *